July 3, 1928.

L. J. BAZZONI 1,675,590

STOP MECHANISM

Original Filed March 1, 1920

INVENTOR.

Patented July 3, 1928.

1,675,590

UNITED STATES PATENT OFFICE.

LEWIS J. BAZZONI, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY.

STOP MECHANISM.

Original application filed March 1, 1920, Serial No. 362,543. Divided and this application filed April 5, 1924. Serial No. 704,519.

This invention relates to stop mechanisms and is herein illustrated as embodied in an automatic stop mechanism arranged to be responsive to a predetermined number of similar operations performed by a machine. The invention is herein illustrated and described with particular reference to its application to controlling buttoning machines of the type set forth in Letters Patent of the United States No. 1,497,007, granted June 10, 1924, upon my application Serial No. 362,543, filed March 1, 1920, of which this is a division, although in various respects this invention is not limited to embodiment in machines of the type just referred to.

In connection with a large class of machines which perform a succession of operations upon a piece, or a series of pieces, of work, it is desirable to provide mechanism for automatically stopping the machine after it has operated upon all the pieces in the series or has performed the desired number of operations upon a single piece.

Typical examples of machines for performing a predetermined number of similar operations upon a single piece of work are to be found in machines for performing buttoning operations on shoes, shoe uppers or gaiters, and in machines for inserting fastenings such as eyelets, lacing hooks, button staples and the like, although the invention is applicable to various other machines in which a succession of operations of a predetermined number is to be performed. Many such machines are capable of handling the work automatically substantially without attention upon the part of the operator but injury to the work or the machine is liable to result unless the machine is stopped when the desired number of operations upon the piece of work in the machine has been finished.

Accordingly, an important object of the invention is to provide an improved stop mechanism arranged to discontinue the operation of a machine after a predetermined number of operations have been performed and adapted, without sacrifice of other utility, to embodiment in a buttoning machine of the type above mentioned.

In accordance with important features of the invention, the illustrated stop mechanism is provided with an actuator cam and with means for moving said actuator cam step by step between successive machine cycles. The actuator cam is arranged to operate stop mechanism to disconnect the machine from its source of power after a predetermined number of machine cycles, a direct reading, manually set device being provided for determining the number of step-by-step movements required to bring the actuator to the point where it will operate the stop mechanism. In the illustrated mechanism means are also provided for resetting automatically the mechanism which controls the automatic stopping of the machine such that until the controlling mechanism is readjusted, in the continued operation of the machine, it will perform automatically a like series of operations each time that the operator sets the machine in motion.

Figures 1, 2, 3, 4:
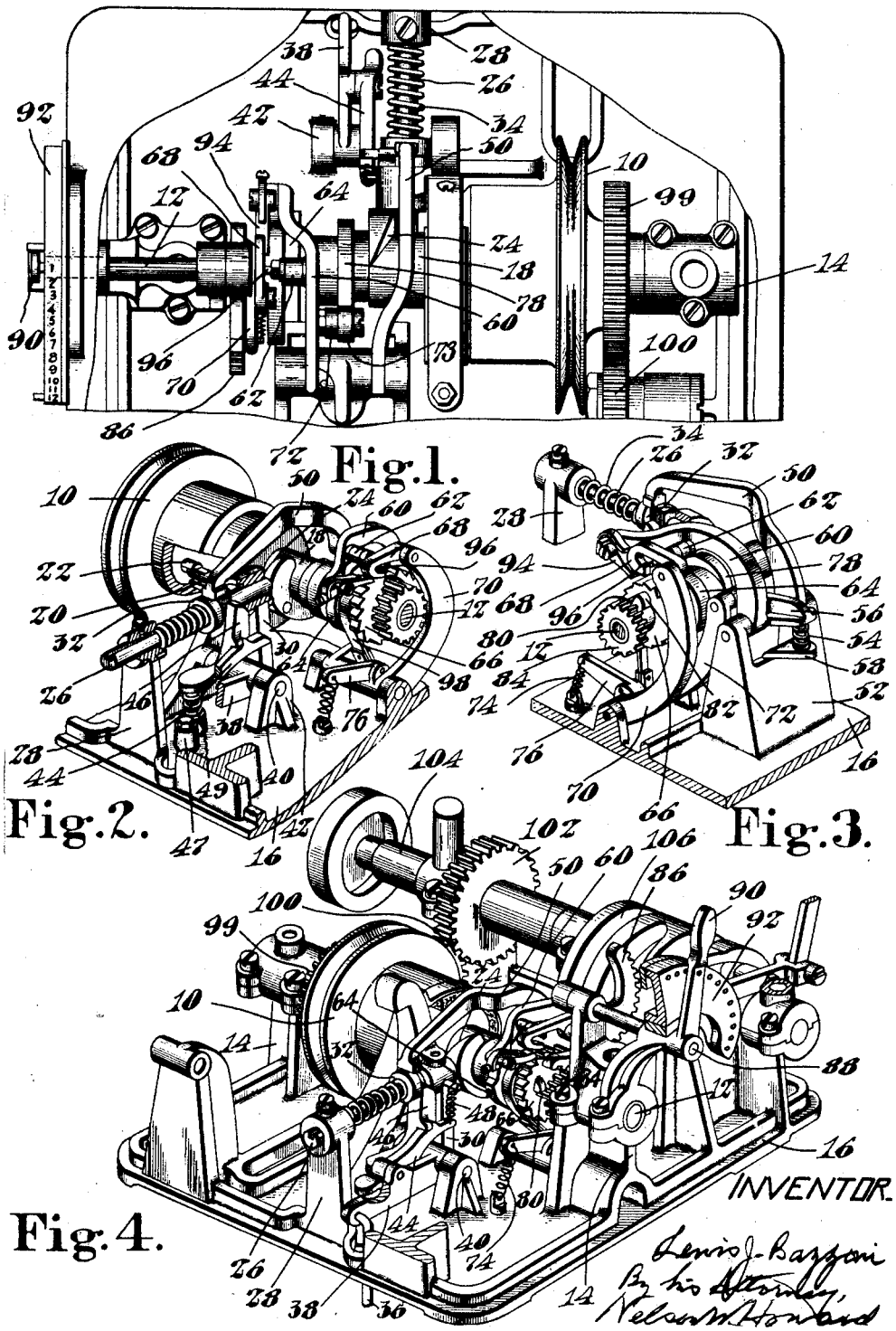
Fig. 1 is a plan view of the improved stop mechanism.
Figs. 2 and 3 are fragmentary perspective views showing parts of the mechanism.
Fig. 4 is a perspective view showing the mechanism connected to the cam shaft of a buttoning machine.

As above indicated, the particular embodiment of the invention selected for purposes of illustration is particularly designed for use in controlling a buttoning machine of the type before mentioned. Power is supplied to drive the machine through a pulley 10 loosely mounted on a drive shaft 12 journaled in standards 14 erected on the bottom plate 16 of the machine frame. The pulley 10 may be clutched to the drive shaft 12 by any suitable means, but, as shown, such means comprises a clutch member 18 keyed to the shaft and having a pin 20 (Fig. 2) adapted to be interposed in the path of movement of a pin 22 carried by the pulley 10. The clutch pin 20 is slidable in the member 18 and is normally maintained by a spring or the like (not shown) in a position operatively to connect the pulley 10 to the drive shaft. The slidable clutch pin 20 has a wedge-shaped cam 24 on its outer end and a rod 26 is provided which may be brought into engagement with said cam to disconnect the clutch member and drive shaft 12 from the pulley 10 by laterally displacing the pin 20. The rod 26 is, as illustrated, mounted for sliding movement in standards 28 and 30 upstanding from the bottom plate 16 of the machine frame and is provided with a collar 32, between which and the standard 28 is interposed a spring 34 (Fig. 1) tending normally to move the end of the rod 26 into engagement with the wedge-shaped cam 24 of the clutch member 18 to disengage the pulley 10 from the drive shaft.

The clutch mechanism may be manually actuated to start the machine by means including a treadle (not shown) connected by the rod 36 (Fig. 4) to the free end of a lever 38 pivoted on a stud 40 journaled in standards 42 on the bottom plate 16. A latch 44 is pivotally secured to the lever 38 and is provided with an upstanding lug for engagement with a lug projecting laterally from a lever 46 also journaled on the stud 40. The lever 46 is adapted, when moved into engagement with the forward end of the collar 32 on the rod 26, to withdraw the inner end of rod 26 from engagement with the cam member 24 to initiate the operation of the machine.

The machine is, however, designed to be stopped independently of the release of the treadle by the operator. Accordingly, a stop 47 (Fig. 2) on the bottom plate 16 is so disposed as to engage the tail of the latch 44 upon the depression of the arm 38, thereby moving the lug on the latch 44 downwardly against the tension of a spring 48 (Fig. 4) connected to the latch and to the standard 30 to release the lever 46 from the control of the latch, said lever when thus released being moved forwardly out of engagement with the collar 32 on the rod 26 by a spring 49 (Fig. 2) interposed between a rearward arm of the lever and a boss on the bottom plate 16.

Prior to this, however, a clutch controlling means has become effective to continue the operation of the machine for an interval. Such controlling means comprises an arm 50 pivoted to the standard 52 (Fig. 3) on the bottom plate 16 and the arm 50 is adapted to be moved into engagement with the forward end of the collar 32 on the rod 26 (see Fig. 2) by means of a spring 54 (when said rod 26 is withdrawn by actuation of the treadle rod 36). This spring 54 (Fig. 3) is disposed between a lug 56 projecting from the hub of the arm 50 and a second lug 58 extending laterally from the standard 52. With this construction, it is apparent that the operation of the machine will be discontinued upon movement of the arm 50 out of engagement with the collar 32 on rod 26 (as in Fig. 3). A second arm 60 extends upwardly from the hub of and is integral with the arm 50 and said arm 60 carries an idler roll 62 adapted for engagement with a cammed actuator 64 sleeved on the shaft 12, which is constructed and arranged to lift the arm 60 at the proper time and thereby to lift the arm 50 and cause the stopping of the machine.

As hereinbefore indicated, means is provided for actuating the clutch controlling mechanism constructed to discontinue the operation of the machine after the performance of a predetermined number of machine operations, such as buttoning operations. To this end, the actuator 64 has formed integrally therewith a ratchet wheel 66; both elements being loose on the shaft 12. The ratchet wheel 66 is actuated intermittently by an actuating pawl 68 on an arm 70 which is fulcrumed on the bottom plate 16 for movement with a second arm 72, and said arms are urged toward the drive shaft 12 by means of a spring 74 (Figs. 2 and 3) connected to the bottom plate 16 and to an arm 76 fixed to the arms 70 and 72. A roll 73 (Fig. 1) on the end of the arm 72 bears on a cam 78 fixed on the shaft 12. This cam 78 is constructed to actuate the arms 70 and 72 and the pawl 68 once upon each rotation of the shaft, and it results that the number of rotations of the drive shaft 12 before its operation is suspended, and, consequently, the number of operations performed by the machine, is determined by the number of step by step movements necessary to be imparted to the ratchet wheel 66 and cam on the actuator 64 before the arm 60 is actuated by the raised portion of the cam on the actuator 64 to lift the arm 50 out of engagement with the collar on the rod 26.

The actuator cam 64 is, in the illustrated construction, initially positioned by means of a stop 80 (Fig. 3) engaged by a lug 82 extending laterally from the ratchet wheel 66 which is integral with the cam 64. In order that the machine may be set to perform a variable number of buttoning operations, the stop 80 is made adjustable. As shown, it constitutes an extension of a tooth of a pinion 84 mounted loosely for rotation on the drive shaft 12 and meshing with a segmental gear 86 (Fig. 4) on a stud shaft 88 journaled in one of the uprights 14. The stud shaft 88 carries an indicator arm 90 co-acting with an indicator plate 92, which is provided with numerals (Fig. 1) to indicate by direct reading the number of operations which will be performed by the machine when the indicator arm is set in any of its various positions of adjustment. The indicator arm 90 is, for convenience in setting the clutch controlling means, formed as a handle for manipulation by the operator.

Retrograde movement of the ratchet wheel 66 and the actuator cam 64 is normally prevented by a holding detent 94 (Fig. 3) on the arm 60. When, however, the arm 60 is actuated by the cam 64 to discontinue the operation of the machine, a pin 96 (see Fig. 2) carried by the arm 60 and lying beneath the actuating pawl 68 elevates the pawl out of engagement with the ratchet wheel 66. Inasmuch as the detent 94 is carried out of engagement with the ratchet wheel by this same movement of the arm 60, the cam 64 is free to be returned to set position as determined by the stop 80. A volute spring 98 (Fig. 2) coiled in a recess of the actuator between the cam 64 and ratchet wheel 66 effects the return movement of the cam and thus automatically resets the actuator upon the completion of each series of operations for which the machine is set.

The application of my novel stop mechanism to a buttoning machine of the type referred to is best indicated in Fig. 4. Here a pinion 99 fixed on the drive shaft 12 meshes with an idler 100 which meshes in turn with a gear 102 on the cam shaft 104 of a buttoning machine. The cams 106 on this shaft are arranged to actuate the operating instrumentalities of the machine so that one button is inserted in a buttonhole for each rotation of the drive shaft 12. For the sake of concreteness, the operation of the stop mechanism will be explained by reciting its operation in connection with a buttoning machine of the above-mentioned type but it will be understood that the operation is similar regardless of the particular machine to which the mechanism is applied.

If, for example, it is desired to operate a buttoning machine to button seven buttons, the indicator arm 90 will be set to register with the numeral 7 on the indicator plate 92 (Fig. 1). The stop 80 will thereby be initially positioned against the tension of the volute spring 98 so as to require seven step by step movements of the ratchet wheel 66 and cam 64 to bring the raised portion of the cam 64 on the actuator beneath the arm 60 to elevate the arm 50 from engagement with the rod 26 so as to stop the machine. The actuating pawl 68 which operates the ratchet wheel is actuated by the cam 78 once upon each revolution of the drive shaft 12 and the buttoning instrumentalities are caused to perform one buttoning operation for each rotation of the shaft. Consequently, the operation of the buttoning instrumentalities will be discontinued after the performance of seven buttoning operations. When the arm 60 is actuated to stop the machine by releasing the rod 26 to engage the cam 24 to disengage the clutch, the pin 96 on said arm elevates the pawl 68 from engagement with the ratchet wheel 66 and the holding detent 94 is lifted away from the ratchet wheel by the elevation of the arm 60, whereupon the volute spring 98 returns the ratchet wheel 66 and cam 64 to initial position as determined by the stop 80. Consequently, if the position of the indicator arm 90 remains unchanged and the treadle rod 36 is again depressed, the machine will perform a second series of seven buttoning operations, after which the operation of the machine will again be discontinued. Thus when my novel stop mechanism is applied to an automatic machine for performing a series of operations, no substantial care or attention on the part of the operator is required from the time that a piece of work is introduced into the machine and the machine started until the work has been discharged from the machine. Since the machine will then be automatically stopped by this novel mechanism, the capacity of the machine to which the mechanism is attached will be increased and the operator enabled to introduce, or prepare to introduce, a succeeding piece of work before the completion of the operation upon the preceding piece. It will be noted that no resetting of the device is necessary so long as the machine is required to perform a like series of operations upon each piece and that it is only necessary for the operator to introduce a piece of work and initiate the operation of the machine.

Having thus described my invention, what I claim as new and desire to secure by Letters Patent of the United States is:—

1. In a machine of the character described, a shaft, a driving member normally operatively connected to the shaft, normally inoperative means for disconnecting said member from the shaft, an actuator sleeved on the shaft for rendering said means operative to disconnect said member from the shaft, and means operated by the shaft for moving said actuator intermittently.

2. In a machine of the character described, a shaft, a driving member normally operatively connected to the shaft, normally inoperative means for disconnecting said member from the shaft, an actuator sleeved on the shaft for rendering said means operative to disconnect said member from the shaft, a ratchet wheel operatively connected to said actuator, and means adapted to be operatively connected to said ratchet wheel to impart step by step movement to said actuator.

3. In a machine of the character described, a shaft, a driving member normally operatively connected to the shaft, and means for disconnecting said member from the shaft comprising a cam sleeved on the shaft, a ratchet wheel connected to the cam, means operated by the shaft and co-acting with said ratchet wheel to move said cam step by step, and means for determining the number of step by step movements of the cam which will cause it to disconnect the member from the shaft.

4. In a machine of the character described, a shaft, a driving member normally operatively connected to the shaft, and means for disconnecting said member from the shaft comprising a cam sleeved on the shaft, a ratchet wheel connected to the cam, means operated by the shaft and co-acting with said ratchet wheel to move the cam step by step, and means for varying the number of step by step movements of the cam which will cause it to disconnect said member from the shaft.

5. In a machine of the character described, a shaft, a driving member normally operatively connected to the shaft, and means for disconnecting said member from the shaft comprising a cam sleeved on the shaft, a ratchet wheel connected to the cam, means operated by the shaft and co-acting with said ratchet wheel to move the cam step by step, a stop co-acting with the sleeve for determining the number of step by step movements necessary to be imparted to said cam to disconnect the member from the shaft, and means for adjusting the stop.

6. In a machine of the character described, a shaft, a driving member normally operatively connected to the shaft, and means for disconnecting the member from the shaft comprising an actuator sleeved on the shaft, means operatively connected with the shaft for moving the actuator, a stop coacting with the actuator to determine the extent of movement of the actuator intermittently which will cause it to disconnect the member from the shaft, and means tending normally to maintain the actuator against said stop.

7. In a machine of the character described, a shaft, a driving member normally operatively connected to the shaft, and means for disconnecting said member from the shaft comprising a cam sleeved on the shaft, a ratchet wheel connected to the cam, means operated by the shaft and co-acting with said ratchet wheel to move the cam step by step, a pinion loosely mounted on the shaft for adjustment, and a stop on said pinion operable to determine the number of step by step movements of the cam which will cause it to disconnect the member from the shaft.

8. In a machine of the character described, a shaft, a driving member normally operatively connected to the shaft, and means for disconnecting said member from the shaft comprising a cam sleeved on the shaft, a ratchet wheel connected to the cam, means operated by the shaft and co-acting with said ratchet wheel to move said cam step by step, a pinion loosely mounted on the shaft for adjustment, a stop on the pinion operable to determine the number of step by step movements of the cam which will cause it to disconnect the member from the shaft, and means for retaining the pinion in various positions of adjustment.

9. In a machine of the character described, a shaft, a driving member normally operatively connected to the shaft, and means for disconnecting said member from the shaft comprising a cam sleeved on the shaft, a ratchet wheel connected to the cam, means operated by the shaft and co-acting with said ratchet wheel to move said cam step by step, a stop for determining the initial position of the cam, means tending to move the cam against the stop, and means for adjusting the stop.

10. In a machine of the character described, a shaft, a driving member normally operatively connected to the shaft, and means for disconnecting said member from the shaft comprising an actuator, means for imparting step by step movements to the actuator, a stop for the actuator, a lever for adjusting the stop, and means associated with the adjusting lever for indicating the number of step by step movements of the actuator which will cause it to disconnect the member from the shaft.

11. In a machine of the character described, a shaft, a driving member normally operatively connected to the shaft, and means for disconnecting said member from the shaft comprising an actuator, means for imparting step by step movements to the actuator, a stop rotatably mounted on the shaft for normally positioning the actuator so as to require a predetermined number of movements of the actuator to disconnect the member from the shaft, and means for automatically returning the actuator to normal position against said stop when said member is disconnected from the shaft.

12. In a machine of the character described, a shaft, a driving member normally operatively connected to the shaft, and means for disconnecting the member from the shaft comprising a rotary actuator provided with a recess, devices actuated by said actuator, means for moving the actuator, means for normally positioning the actuator so that movement of the actuator to a predetermined extent will cause it to actuate said devices, means for disconnecting the actuator from its moving means upon actuation of said devices by the actuator, and a coiled spring disposed in the recess of said actuator for automatically returning the actuator to normal position.

13. In a machine of the character described, a shaft, a driving member normally operatively connected to the shaft, and means for disconnecting the driving member from the shaft comprising an actuator, an arm disposed to be actuated by said actuator, means for moving the actuator including a pawl and a ratchet wheel, and means carried by the arm and co-acting with the ratchet wheel to prevent reverse movement of the actuator and movable upon actuation of the arm by the actuator out of operative relation to the ratchet wheel to permit such movement of the actuator.

In testimony whereof I have signed my name to this specification.

LEWIS J. BAZZONI.

CERTIFICATE OF CORRECTION.

Patent No. 1,675,590.                                Granted July 3, 1928, to

LEWIS J. BAZZONI.

It is hereby certified that error appears in the printed specification of the above numbered patent requiring correction as follows: Page 4, line 28, claim 6, strike out the word "intermittently" and insert the same to follow after the word "actuator" in line 26; and that the said Letters Patent should be read with this correction therein that the same may conform to the record of the case in the Patent Office.

Signed and sealed this 7th day of May, A. D. 1929.

(Seal)                                                     M. J. Moore,
Acting Commissioner of Patents.